United States Patent [19]

Fukushima et al.

[11] Patent Number: 4,952,609
[45] Date of Patent: Aug. 28, 1990

[54] ACRYL RUBBER FOAMING COMPOSITIONS AND FOAMED ACRYL RUBBER

[75] Inventors: Motoo Fukushima, Kawasaki; Masaharu Takahashi; Kunio Itoh, both of Annaka, all of Japan

[73] Assignee: Shin-Etsu Chemical Co., Ltd., Toyko

[21] Appl. No.: 476,595

[22] Filed: Feb. 7, 1990

[30] Foreign Application Priority Data

Feb. 7, 1989 [JP] Japan .................................. 1-27851

[51] Int. Cl.$^5$ ............................................. C08J 9/10
[52] U.S. Cl. ........................................ 521/94; 521/96; 521/149; 521/154; 526/279
[58] Field of Search ................. 526/279; 521/149, 154, 521/94, 96

[56] References Cited

U.S. PATENT DOCUMENTS

| | | | |
|---|---|---|---|
| 4,822,864 | 4/1989 | Chen | 526/279 |
| 4,824,922 | 4/1989 | Chopman | 526/279 |
| 4,861,840 | 8/1989 | Lim et al. | 526/279 |
| 4,886,864 | 12/1989 | Foley, Jr. | 526/279 |

*Primary Examiner*—Morton Foelak
*Attorney, Agent, or Firm*—Birch, Stewart, Kolasch & Birch

[57] ABSTRACT

Acryl rubber foaming compositions comprising (A) an acrylic polymer prepared by copolymerizing an acrylate or methacrylate with a monomer having at least two aliphatic unsaturated bonds per molecule, (B) a pyrolytic organic foaming agent, and (C) an organic peroxide can be molded, cured and foamed into acryl rubber foams having improved heat insulation, heat resistance, weatherability, crack resistance, and oil resistance without a need for sulfur vulcanizer.

4 Claims, No Drawings

ACRYL RUBBER FOAMING COMPOSITIONS AND FOAMED ACRYL RUBBER

This invention relates to acryl rubber foaming compositions capable of providing foamed moldings having improved thermal insulation, heat resistance, weatherability, crack resistance, and oil resistance as well as foamed acryl rubber articles obtained therefrom.

BACKGROUND OF THE INVENTION

Typical of prior art rubber foams having heat resistance are silicone rubber foams which are undesirably poor in oil resistance. Fluorocarbon rubber, chloroprene rubber, and acrylonitrile-butadiene rubber (NBR) are known as foam rubbers having oil resistance. Among them, the foamed fluorocarbon rubber is less efficient to process and expensive, the foamed chloroprene rubber and NBR are low in heat resistance and weatherability because of the presence of numerous double bonds in their polymer molecule. There is a need for inexpensive rubber foams having high oil resistance, heat resistance, and weatherability as well as ease of molding.

Acryl rubber is a group of rubbery elastomers based on acrylate esters having excellent properties. Most often, these polymers have copolymerized therewith monomers having an active radical providing a crosslinking site. Based on the type of crosslinking radical providing monomer, the acryl rubbers are generally classified into a chlorine crosslinking type using chloroethyl vinyl ether, an active chlorine crosslinking type using vinyl chloroacetate, an epoxy crosslinking type using allyl glycidyl ether, and a non-chlorine crosslinking type using acrylic acid. When organic foaming agents which are decomposed at 40° to 280° C. to generate gas are used in these crosslinking types of acryl rubber, the balance between foaming and crosslinking/curing is lost, failing to produce a foam having a fine textured cell structure.

Only one successful acryl rubber foam is disclosed in Japanese Patent Application Kokai No. 82134/1980 and Japanese Patent Publication No. 15138/1984 as being obtained by copolymerizing ethyl acrylate with ethylidene norbornene in the presence of 2-mercaptobenzothiazole and vulcanizing the acryl rubber with sulfur in the presence of a pyrolytic foaming agent. Based on sulfur vulcanization, this foaming method requires addition of sulfur or a sulfur-containing vulcanizer, which inevitably gives off an offensive smell during foam preparation. In addition, sulfur vulcanized acryl rubbers suffer from losses of rubber elasticity, compression set, heat resistance, and durability.

Therefore, an object of the present invention is to eliminate the above-mentioned problems and to provide a novel and improved acryl rubber foaming composition which can be vulcanized with peroxide into an acryl rubber foam having a uniform fine independent cell structure without a need for sulfur or sulfur-containing vulcanizer. Another object of the present invention is to provide an acryl rubber foam having improved heat resistance, weatherability, crack resistance, and oil resistance.

SUMMARY OF THE INVENTION

The inventors have found that when an acrylic polymer prepared by copolymerizing an acrylate or methacrylate ester of the formula:

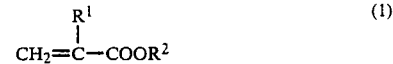

wherein $R^1$ is a hydrogen atom or a methyl radical, and $R^2$ is a substituted or unsubstituted alkyl or alkoxyalkyl radical, with a monomer having at least two aliphatic unsaturated bonds per molecule is foamed and cured with the aid of a pyrolytic organic foaming agent such as an azodicarbonamide foaming agent and an organic peroxide, there is obtained a foam without an offensive smell and at no sacrifice of the oil resistance, heat resistance, weatherability and hygienic safety of acryl rubber. Heat foaming and curing in an air oven is possible because the inert gas given off during decomposition of the foaming agent prevents vulcanization retardation by oxygen.

According to the present invention, there is provided an acryl rubber foaming composition comprising in admixture, (A) an acrylic polymer as defined above, (B) a pyrolytic organic foaming agent, and (C) an organic peroxide.

DETAILED DESCRIPTION OF THE INVENTION

The acrylic polymer (A) of the acryl rubber foaming composition of the invention is an acrylic polymer prepared by copolymerizing an acrylate or methacrylate ester of the formula:

wherein $R^1$ is a hydrogen atom or a methyl radical, and $R^2$ is a substituted or unsubstituted alkyl or alkoxyalkyl radical, with a monomer having at least two aliphatic unsaturated bonds per molecule. Preferably $R^2$ in formula (1) is a substituted or unsubstituted alkyl radical having 1 to 6 carbon atoms or an alkoxyalkyl radical having 2 to 6 carbon atoms, the latter being represented by $-R^3-OR^4$ wherein $R^3$ is a methylene or ethylene radical and $R^4$ is a methyl, ethyl, propyl or butyl radical. Preferred examples of $R^2$ include a methyl radical, ethyl radical, propyl radical, n-butyl radical, methoxyethyl radical, ethoxyethyl radical, etc. and such radicals in which some or all of the hydrogen atoms therein are replaced by fluorine atoms such as a trifluoromethyl radical, 2,2,2-trifluoroethyl radical, and 3,3,3-trifluoropropyl radical.

The monomer which is copolymerized with the acrylate or methacrylate of formula (1) has at least two aliphatic unsaturated bonds per molecule. When one of the aliphatic unsaturated bonds of the monomer copolymerizes with the acrylate or methacrylate of formula (1), the other aliphatic unsaturated bond is left unreacted in the resulting acrylic polymer (copolymer). This remaining unsaturated bond is effective in later crosslinking induced by an organic peroxide. In this sense, the two aliphatic unsaturated bonds should preferably possess different reactivity from each other.

Examples of the monomer having at least two aliphatic unsaturated bonds per molecule include ethylidene norbornene, methylidene norbornene, dicyclopentadiene, etc. and preferably monomers having an aliphatic unsaturated bond attached to a silicon atom, especially monomers having an Si-vinyl radical. The last-mentioned monomers having an Si-vinyl radical include an acrylate, methacrylate, and styrene each having an Si-vinyl radical. Since the Si-vinyl radical in the monomers is less prone to copolymerization with the acrylate or methacrylate of formula (1), it is left as such in the copolymer without gelation during copolymerization and remains effective for crosslinking upon subsequent peroxide vulcanization.

Examples of the monomers having an Si-vinyl radical include those described in U.S. Pat. No. 4,722,975 and Japanese Patent Publication No. 40380/1987, especially those compounds of the following formulae (2) through (6).

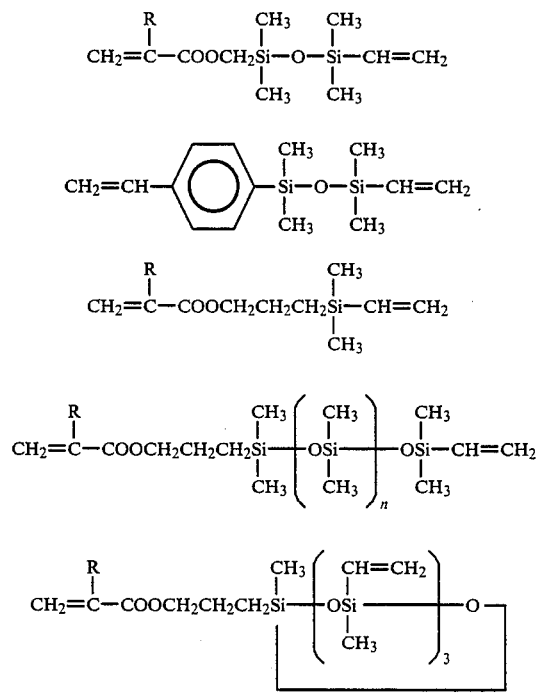

In the formulae, R is hydrogen or a methyl radical, and n is an integer of 0 to 15.

Preferred among these is the compound of formula (6). Since the monomer of formula (6) possesses a siloxane ring skeleton having a thermally well stable crosslinking site, there can be obtained an acryl rubber foam having excellent heat resistance and other properties after vulcanization.

The acrylate or methacrylate of formula (1) is preferably copolymerized with the monomer having at least two aliphatic unsaturated bonds in such proportion that there are present 99.99 to 90% by weight, more preferably 99.5 to 95% by weight of the acrylate or methacrylate of formula (1) and 0.01 to 10% by weight, more preferably 0.5 to 5% by weight of the monomer. If the amount of the monomer used is less than 0.01% by weight, there would exist too less crosslinking sites to provide a foam with sufficient strength. If the amount of the monomer used is more than 10% by weight, there would exist too much crosslinking sites, resulting in an extremely hard foam.

Component (B) is a pyrolytic or thermally decomposable organic foaming agent which may be selected from those commonly used in rubber and plastic foams in the prior art. Typical examples are nitrile foaming agents such as azobisisobutyronitrile, etc., nitroso foaming agents such as dinitropentamethylenetetramine, etc., and preferably azodicarbonamide foaming agents. The azodicarbonamide ($H_2NCO-N=N-CONH_2$) foaming agents are commercially available from several manufacturers, for example, as CELLMIC by Sankyo Chemicals K.K. and VINYFOR AC by Eiwa Kasei K.K. The amount of component (B) is not critical although it preferably ranges from about 2 to about 10 parts by weight per 100 parts by weight of component (A).

It is possible to add a pyrolysis accelerator to lower the decomposition temperature of the foaming agent in order that the foaming agent decompose at processing temperatures suitable for molding of foams. Examples of the pyrolysis accelerator include urea compounds, metal compounds such as zinc oxide, and metal soaps such as zinc stearate. In general, the pyrolysis accelerator is added in amounts of about 1 to about 2 mol per mol of the foaming agent. Too much amounts of the accelerator are undesirable because processing becomes difficult and a final foamed product contains foams of deteriorated configuration.

Component (C) is an organic peroxide which is added for the purpose of crosslinking the acrylic polymer (A). Illustrative, but non-limiting examples of the organic peroxide include benzoylperoxide, 2,4-dichlorobenzoylperoxide, t-butylperbenzoate, di-t-butylperoxide, dicumylperoxide, 2,5-bis(t-butylperoxy)-2,5-dimethylhexane, and 2,5-bis(t-butylperoxy)-2,5-dimethylhexene, and mixtures thereof. The amount of component (C) is not critical although it preferably ranges from about 0.1 to about 10 parts by weight per 100 parts by weight of component (A).

In addition to the essential components mentioned above, the compositions of the invention may further contain any desired additives, preferably extending and reinforcing fillers for the purposes of thickening, facilitated processing, extending or reinforcing the acryl rubber foams. The reinforcing fillers include carbon, fumed silica, wet silica, ground quartz, diatomaceous earth and mixtures thereof. These fillers preferably have a specific surface area of at least 10 $m^2/g$. The amount of the filler blended may vary with the type of filler and the intended application of foamed moldings although it preferably range from about 3 to about 100 parts, especially from about 10 to about 60 parts by weight per 100 parts by weight of component (A).

The compositions of the invention may optionally contain fatty acids (such as stearic acid) for improved roll milling, silicones (such as low molecular weight siloxanes having a degree of polymerization of up to 100, silanol-containing silanes, and alkoxysilanes) for improved dispersion of fillers, plasticizers (such as Komorek No. 2 oil, SUMPAR 2280, and PW-380) for controlled viscosity of the composition, antioxidants (such as Nauguard 455 and Irganox 1010), and carbon functional silanes.

The compositions of the invention can be foamed and cured into acryl rubber foams simply by blending component (A) with components (B) and (C), molding the composition to any desired shape, and causing the composition to foam and cure. The foaming/curing conditions vary with particular types of components (B) and (C). Foaming and curing may be carried out according to conventional procedures for pyrolytic organic foaming agents and for peroxide vulcanization, typically at temperatures of from 120° to 200° C. (higher than the decomposition temperature of peroxide) and pressures of from atmospheric pressure to 50 kgf/cm² for about 1 to 20 minutes. Molding may be in accord with any well-known methods.

The foams were examined for foaming state, specific gravity, and ASKER C hardness, with the results shown in Table 1.

TABLE 1

|  | Examples & Comparative Examples | | | | | |
|---|---|---|---|---|---|---|
|  | E1 | CE1 | CE2 | CE3 | E2 | E3 |
| Polymer Composition (pbw) | P1 | P1 | P2 | P2 | P3 | P3 |
| Ethyl acrylate | 50 | 50 | 50 | 50 | 0 | 0 |
| Butyl acrylate | 25 | 25 | 25 | 25 | 70 | 70 |
| Methoxyethyl acrylate | 25 | 25 | 25 | 25 | 30 | 30 |
| Formula (6) compound (R = CH₃) | 1.5 | 1.5 | 0 | 0 | 1.5 | 1.5 |
| Vinyl chloroacetate | 0 | 0 | 1.5 | 1.5 | 0 | 0 |
| ML$_{100}$ | 48 | 48 | 49 | 49 | 35 | 35 |
| Base compound (pbw) | B1 | B1 | B2 | B2 | B3 | B4 |
| Polymer | P1 100 | P1 100 | P2 100 | P2 100 | P3 100 | P3 100 |
| Aerosil R-972[1] | 0 | 0 | 0 | 0 | 60 | 60 |
| Nipsil LpVN₃[2] | 40 | 40 | 40 | 40 | 0 | 0 |
| ZnO | 5 | 5 | 5 | 5 | 5 | 5 |
| Stearic acid | 1 | 1 | 1 | 1 | 1 | 1 |
| Naufuard 445[3] | 1 | 1 | 1 | 1 | 1 | 0 |
| Irganox 1010[4] | 0 | 0 | 0 | 0 | 0 | 1 |
| Komorex No. 2[5] | 0 | 0 | 0 | 0 | 0 | 5 |
| LS-520[6] | 5 | 5 | 5 | 5 | 0 | 2 |
| Foaming Composition (pbw) | | | | | | |
| Base compound | B1 100 | B1 100 | B2 100 | B2 100 | B3 100 | B4 100 |
| CELLMIC C[7] | 4.5 | 0 | 4.5 | 4.5 | 4.5 | 4.5 |
| Dicumyl peroxide | 2 | 2 | 2 | 0 | 2 | 2 |
| Sulfur | 0 | 0 | 0 | 0.5 | 0 | 0 |
| Sodium stearate | 0 | 0 | 0 | 3 | 0 | 0 |
| Potassium stearate | 0 | 0 | 0 | 1 | 0 | 0 |
| Foamed Molding | | | | | | |
| State | soft sponge | not foamed | not vulcanized | not vulcanized | soft sponge | soft sponge |
| Specific gravity | 0.29 | 1.20 | — | — | 0.18 | 01.6 |
| ASKER C hardness | 18 | 75 | — | — | 14 | 11 |

Note:
[1] fumed silica, Degussa
[2] wet silica, Nihon Silica K.K.
[3] antioxidant, Uniroyal Co.
[4] antioxidant, Ciba Geigy Co.
[5] plasticizer, Nihon Petroleum K.K.
[6] dimethyldimethoxysilane (Shin-Etsu Chemical Co., Ltd.)
[7] azodicarbonamide foaming agent (Sankyo Chemicals K.K.)

The acryl rubber foaming compositions of the present invention can be molded, foamed and cured at a controlled rate of vulcanization under economic vulcanizing and foaming conditions without a need for sulfur. The resulting foams are less toxic, readily colorable, and odorless and have improved heat insulation, heat resistance, weatherability, crack resistance, oil resistance, and chemical resistance.

EXAMPLE

Examples of the present invention are given below by way of illustration and not by way of limitation. All parts and percents are by weight unless otherwise stated.

Examples 1–3 and Comparative Examples 1–3

Acrylic copolymers were prepared from the components shown in Table 1. Base compounds were then prepared by evenly milling each of the acrylic copolymers with the remaining components shown in Table 1 for 10 minutes by means of hot rolls at 120° C. Acryl rubber foaming compositions were then prepared by milling the base compounds with the remaining components shown in Table 1.

The compositions were fully deaerated, placed in a press mold having a cavity of 6 mm by 150 mm by 50 mm, heated at a temperature of 165° C. for 5 minutes under a pressure 30 kgf/cm², and after pressure release, allowed to foam for 10 minutes in an oven at 180° C. There were obtained acryl rubber foams.

EXAMPLE 4

The foaming composition of Example 1 was extruded into a cylindrical bar by means of a 20 mm diameter extruder (plastomill) at a screw revolution of 50 r.p.m., a barrel temperature of 70° C., and a head temperature of 110° C. The bar was heated for 10 minutes in an air oven at 180° C. for foaming, resulting in an acryl rubber foam having an aesthetic surface and a fine cell structure. It had the following physical properties.

Foaming factor: 319%
Specific gravity: 0.375
ASKER C hardness: 25

Although some preferred embodiments have been described, many modifications and variations may be made thereto in the light of the above teachings. It is therefore to be understood that within the scope of the appended claims, the invention may be practiced otherwise than as specifically described.

We claim:

1. An acrylic rubber foaming composition comprising in admixture:

(A) an acrylic polymer prepared by copolymerizing 90% to 99.99% by weight of an acrylate or methacrylate of the formula:

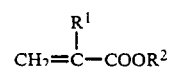

wherein R[1] is a hydrogen atom or methyl radical, and R[2] is a substituted or unsubstituted alkyl radical having 1 to 6 carbon atoms or an alkoxyalkyl radical having 2 to 6 carbon atoms, and being represented by —R[3]—OR[4] wherein R[3] is a methylene or ethylene radical and R[4] is a methyl, ethyl, propyl or butyl radical, with 10% to 0.01% by weight of a monomer having at least two aliphatic unsaturated bonds per molecule, wherein one of the aliphatic unsaturated bonds is attached to a silicon atom;

(B) a pyrolytic organic foaming agent at about 2 to about 10 parts by weight per 100 parts by weight of the acrylic polymer; and (C) an organic peroxide at about 0.1 to about 10 parts by weight per 100 parts by weight of the acrylic polymer.

2. The acryl rubber foaming composition of claim 1 wherein said monomer is selected from the group consisting of compounds of the following formulae (2) to (6) wherein R is hydrogen or a methyl radical, and n is an integer of 0 to 15:

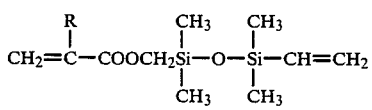 (2)

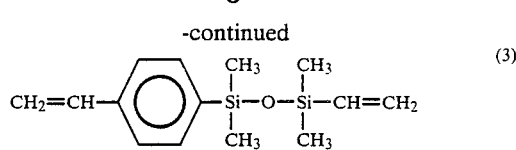 (3)

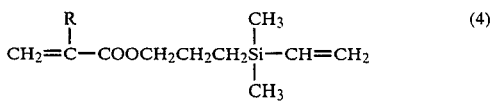 (4)

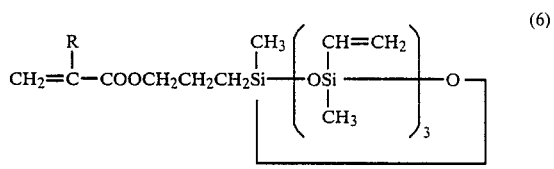 (6)

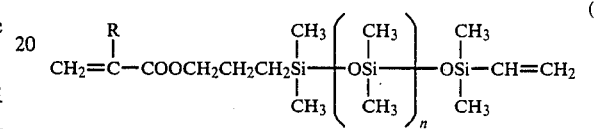 (5)

3. The acryl rubber foaming composition of claim 1 wherein the pyrolytic organic foaming agent is selected from the group consisting of nitrile foaming agents, nitroso foaming agents, and azodicarbonamide foaming agents.

4. The acryl rubber foaming composition of claim 1 which further comprises a filler in an amount of about 3 to about 100 parts per 100 parts by weight of the acrylic polymer.

* * * * *